United States Patent [19]
D'Errico

[11] Patent Number: 5,631,707
[45] Date of Patent: May 20, 1997

[54] AUTOMATIC IDENTIFICATION AND MEMORIZATION DEVICE OF TELEVISION STATIONS

[75] Inventor: Federico D'Errico, Rome, Italy

[73] Assignee: Edico S.R.L., Rome, Italy

[21] Appl. No.: 385,642

[22] Filed: Feb. 8, 1995

[30] Foreign Application Priority Data

Feb. 8, 1994 [IT] Italy .................. RM94A0057

[51] Int. Cl.⁶ .......................... H04N 5/50; H04N 5/76
[52] U.S. Cl. ..................... 348/461; 348/731; 348/473; 348/476; 455/186.1
[58] Field of Search ................ 348/731, 732, 348/558, 434, 435, 461, 465, 468, 473, 476, 477, 478, 479, 460, 906; 455/162.1, 186.1; H04N 5/50, 5/76

[56] References Cited

U.S. PATENT DOCUMENTS

| | | | |
|---|---|---|---|
| 3,882,400 | 5/1975 | Hamada | 455/158.3 |
| 4,313,213 | 1/1982 | Farina et al. | 455/158 |
| 4,368,486 | 1/1983 | Degoulet et al. | 348/461 |
| 4,805,020 | 2/1989 | Greenberg | 348/461 |
| 4,969,209 | 11/1990 | Schwob | 455/186.1 |
| 5,083,205 | 1/1992 | Arai | 348/731 |
| 5,152,012 | 9/1992 | Schwob | 455/186.1 |
| 5,191,423 | 3/1993 | Yoshida | 348/731 |
| 5,237,420 | 8/1993 | Hayashi | 348/731 |
| 5,343,300 | 8/1994 | Hennig | 348/473 |
| 5,393,713 | 2/1995 | Schwob | 348/732 |

FOREIGN PATENT DOCUMENTS 0486988   5/1992   European Pat. Off. ......... H04N 5/76

Primary Examiner—Glenton B. Burgess
Attorney, Agent, or Firm—Sughrue, Mion, Zinn, Macpeak & Seas

[57] ABSTRACT

A device for identifying and memorizing television stations which respectively transmit television signals is provided. The device includes a receiver for selectively receiving the television signals and a control circuit for evaluating the television signals to automatically identify the television stations which transmit the signals. Furthermore, the control circuit enables the television stations to be memorized in an established order which is independent from a transmission frequency of the television stations. Also, the device contains a memory for memorizing a plurality of different rules for identifying the television stations. In order to identify the stations, the control circuit executes a first identification attempt to identify the television stations, and the first identification attempt is executed according to one the plurality of different rules. When the first identification attempt is unsuccessful, the control circuit executes a second identification attempt to identify the television stations, and the second identification attempt is executed according to another of the plurality of different rules.

36 Claims, 2 Drawing Sheets

1

AUTOMATIC IDENTIFICATION AND MEMORIZATION DEVICE OF TELEVISION STATIONS

FIELD OF THE INVENTION

The present invention relates to a device which is capable of identifying and memorizing television stations. More particularly, the present invention relates to a television signal receiver, which comprises control means for automatically identifying the television stations and memorizing them in a particular order that is independent from the transmission frequency of the signals.

BACKGROUND OF THE INVENTION

A radio receiver that can search all receivable stations and automatically and sequentially store them in memory is disclosed in U.S. Pat. No. 3,882,400. As disclosed in the patent, the broadcasting stations are memorized in the order of increasing transmission frequency.

Italian patent no. 1.107.168 discloses a receiver equipped with broadcaster selection means and memory means. Furthermore, a user watching the receiver can manually memorize a certain number of received television broadcasters in an order desired by the user.

European patent application no. 0486988 discloses a selection and memorization device of radioelectric signals which comprises control means for automatically identifying sources of the signals and memorizing them in a certain order. Moreover, the device utilizes broadcaster identification signals which are inserted into the signals during the transmission of the radioelectric signals. For example, the broadcast identification signals may be inserted according to various norms such as the French DIDON ANTIOPE, the German V.P.S., or E.B.U. norms. Such norms insert the broadcaster identification signals in predetermined lines of the teletext signal.

Although the majority of the broadcasting stations insert an identification signal in the television signal, the stations have not agreed upon a standard norm for inserting the identification signal. For example, Germany utilizes the V.P.S. norm. However, Italy and other European countries do not use the V.P.S. norm but use various other E.B.U. norms.

SUMMARY OF THE INVENTION

The purpose of the present invention is that of indicating how it is possible to realize an identification and memorization device of television stations, in particular apt for a television signals receiver, that is able to automatically carry out such operations if not in all, at least in the majority of cases of which an identification is effectively inserted in the transmitted signal.

For reaching such purpose the subject of the present invention present is an identification and memorization device of television stations, in particular apt for a television signals receiver, comprising control means that automatically provide to identify said television stations and to memorize them in an established order, independent from the transmission frequency of the same, characterized in that said device provides the possibility to memorize a plurality of different rules for realizing the identification of said sources and to execute in succession a plurality of identification attempts, and precisely at least a first attempt according to the first of said memorized rules, and, in the case it is unsuccessful, at least a second attempt according to the second of said memorized rules. In a particular embodiment, the present invention has as its subject an identification and memorization device of television stations, as indicated above, characterized in that said control means, for realizing the identification of said sources, proceed to search and decode in first application an identification inserted in line 30 of the teletext signal of the transmitted television signal and that said control means, for realizing the identification of said sources, proceed to search and decode in second application an inserted identification in line 0 of the teletext signal of the transmitted television signal.

BRIEF DESCRIPTION OF THE DRAWINGS

Further characteristics and advantages of the present invention will be readily understood from the following illustrative and non-limiting description of the preferred embodiments of the invention and from the drawings, wherein.

DETAILED DESCRIPTION OF THE PREFERRED EMBODIMENTS

Figure 1:
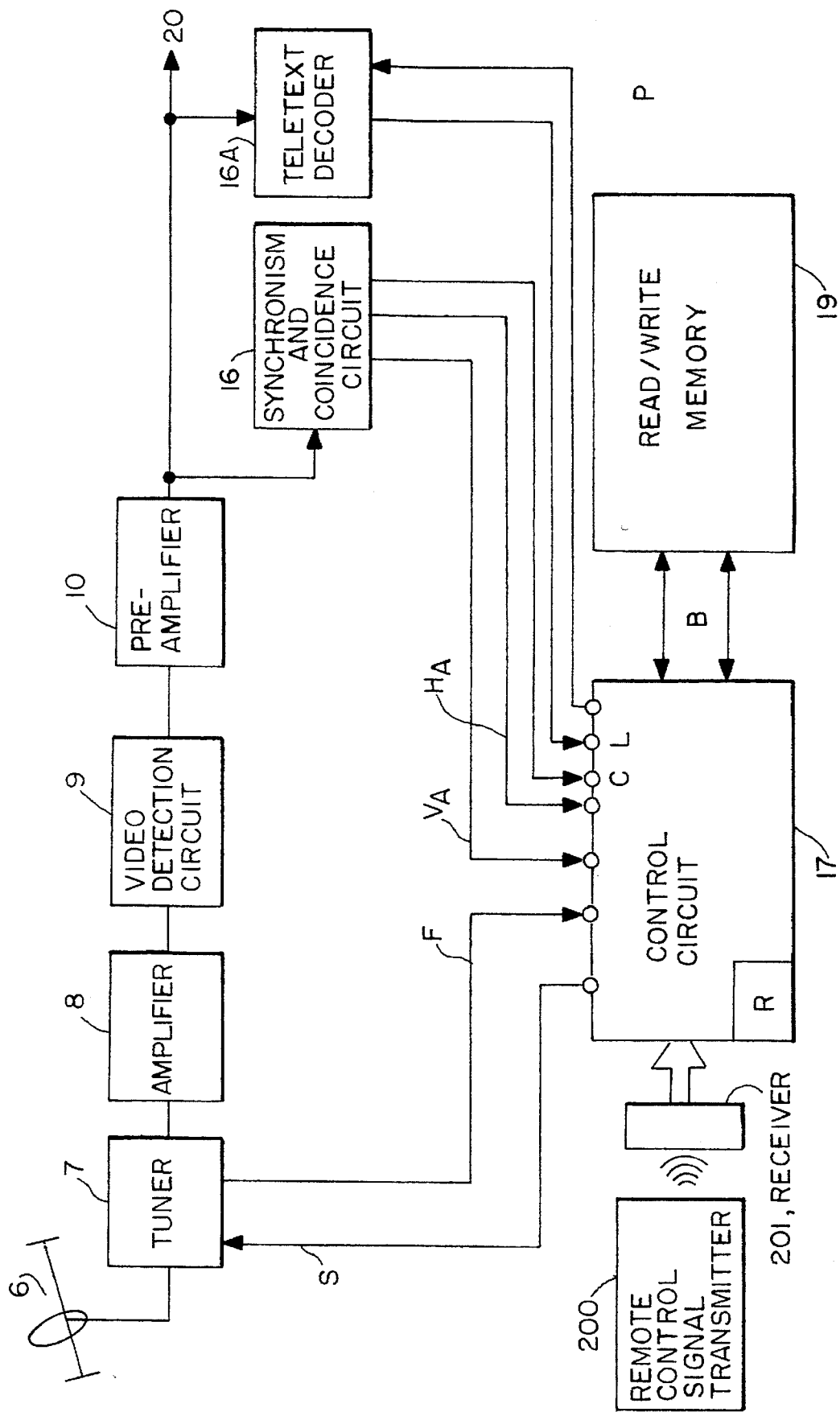
FIG. 1 is block diagram of a circuit according to the present invention.

FIG. 1 illustrates a block diagram of a circuit of one embodiment of the present invention which is incorporated into a television signal receiver. As shown in the figure, the device comprises a receiving antenna 6, a frequency synthesis tuner 7, an amplifier 8, a video detection circuit 9, and a pre-amplifier 10.

The antenna 6 receives a television signal transmitted from a remote source, and the tuner 7 selectively tunes such signal and outputs an intermediate frequency signal corresponding to the tuned signal. The amplifier 8 inputs and amplifies the intermediate frequency signal and outputs the amplified signal to the video detection circuit 9. The video detection circuit 9 extracts a detected video signal from the amplified signal, and the preamplifier 10 inputs the detected video signal and outputs a corresponding pre-amplified video signal 20.

The circuit illustrated in FIG. 1 also comprises a synchronism and coincidence circuit 16, a teletext decoder 16A, a control circuit 17, and a read/write memory 19. The synchronism and coincidence circuit 16 inputs the pre-amplified video signal 20 and generates vertical and horizontal synchronism signals $V_A$ and $H_A$ in accordance with impulses contained in the video signal 20. In addition to producing the signals $V_A$ and $H_A$, the circuit 16 also determines if the signal 20 is synchronized with locally produced deflection signals and generates a corresponding coincidence signal C based on such determination. The coincidence signal C is output from the circuit 16 and is input to a terminal C of the control circuit 17. Furthermore, the manner in which the circuit 16 generates the synchronism signals $V_A$ and $H_A$ and determines if the pre-amplified video signal 20 is synchronized with the locally produced deflection signals is known to one skilled in the art.

The teletext decoder 16A also inputs the pre-amplified video signal 20 and decodes the teletext signal contained in the signal 20. After the teletext signal is decoded, the decoder 16A extracts a broadcaster identification signal L and outputs the identification signal L to a terminal L of the control circuit 17. Furthermore, the circuit 16A may be programmed by the control circuit 17 to search for the identification signal L in accordance with the programming disclosed in the E.B.U. SPB 459 document. On the other hand, the teletext decoder 16A may be programmed to search for the signal L in accordance with the E.B.U. document "Interim Technical Document SPB 492".

Based on the disclosure of the documents above, the identification signal L may inserted in the transmitted television signal using the 8/30 packet. Alteratively, the signal L may be inserted in line 30 of the teletext signal (i.e. the "ghost row") which is transmitted about once each second. As stated in the above mentioned E.B.U. documents, the identification signal L comprises a permanent code that unequivocally identifies the broadcaster of the television signal and is contained in bytes 13 and 14 of the 8/30 packet.

The pre-amplified signal 20 is also output to a display system (e.g. a picture tube) via one or more video amplifiers. However, since such amplifiers and display system do not relate to the gist of the present invention, the detailed description of such devices is omitted.

FIG. 1 also illustrates a remote control signal transmitter 200 and a remote control receiver 201. The transmitter 200 may transmit signals via infrared light and may contain a plurality of command buttons (not shown) to enable a user to input various commands. For example, the transmitter 200 may comprise a button M which can be depressed to command the circuit to search for and automatically memorize signals received by the antenna in an particular order. For instance, the circuit may be commanded to search for and memorize the signals in an order which represents how frequently such signals are used. Furthermore, the circuit may store the signals in same order adopted by automatic registration systems in the same zone (e.g. the so called "Show View"). The remote control receiver 201 receives the command signals transmitted from the transmitter 200 and outputs such signals to the control circuit 17.

In addition to the commands signals output from the receiver 201, the control circuit 17 inputs the vertical synchronism signal $V_A$, the horizontal synchronism signal HA, and the coincidence signal C from the synchronism and coincidence circuit 16. Furthermore, the circuit 17 inputs a frequency signal F from the tuner 7 and outputs a tuning control signal S to the tuner 7.

In addition, the control circuit 17 inputs the broadcaster identification signal L from the teletext decoder 16A and determines the identity of the broadcaster based on such signal L. However, if the broadcaster identification signal L does not contain the identity of the broadcaster, the circuit 17 outputs a command signal P to the circuit 16A to instruct the circuit 16A to search for the identification of the broadcaster in a different portion of the pre-amplified video signal 20. For example, since many broadcasters which do not utilize the 8/30 packet write their name in the zeroth line of the teletext signal, the command signal P may command the teletext decoder 16A to search for the identity of the broadcaster in the zeroth line of the teletext signal.

The read/write memory 19 is connected to the control circuit 17 via a bidirectional bus B and stores various tuning information relating to a plurality of television stations tuned by the tuner 7.

As indicated above, the control circuit 17 is a logic circuit (e.g. a microprocessor) which contains or is associated with a read only memory (ROM) R. The ROM R stores a series of instructions and other data for operating the circuit 17. For instance, the instructions may include:

a plurality of rules or criteria for searching for the identification information relating to the broadcasted stations (e.g. 8/30 packet format 1; 8/30 packet format 2; line 16-VPS; line 0; etc.) and a rule or criteria for storing the tuning information in the read/write memory 19 in a particular order based on the broadcast station's identification.

Furthermore, the contents of the ROM R may be programmed at a factory where the television signal receiver is built and may contain a plurality of instructions that can be selected depending on the location in which the receiver is utilized.

The control circuit 17 manages the overall operation of the receiver. For instance, the circuit 17 decodes the commands input by the user via the remote control signal transmitter 200, controls the tuning of selected television signals through the antenna 6 and the tuner 7, stores the tuning information relating to such television signals in the read/write memory 19, and selectively reads the tuning information from the memory 19 to subsequently tune a television signal selected by the user.

Figure 2:
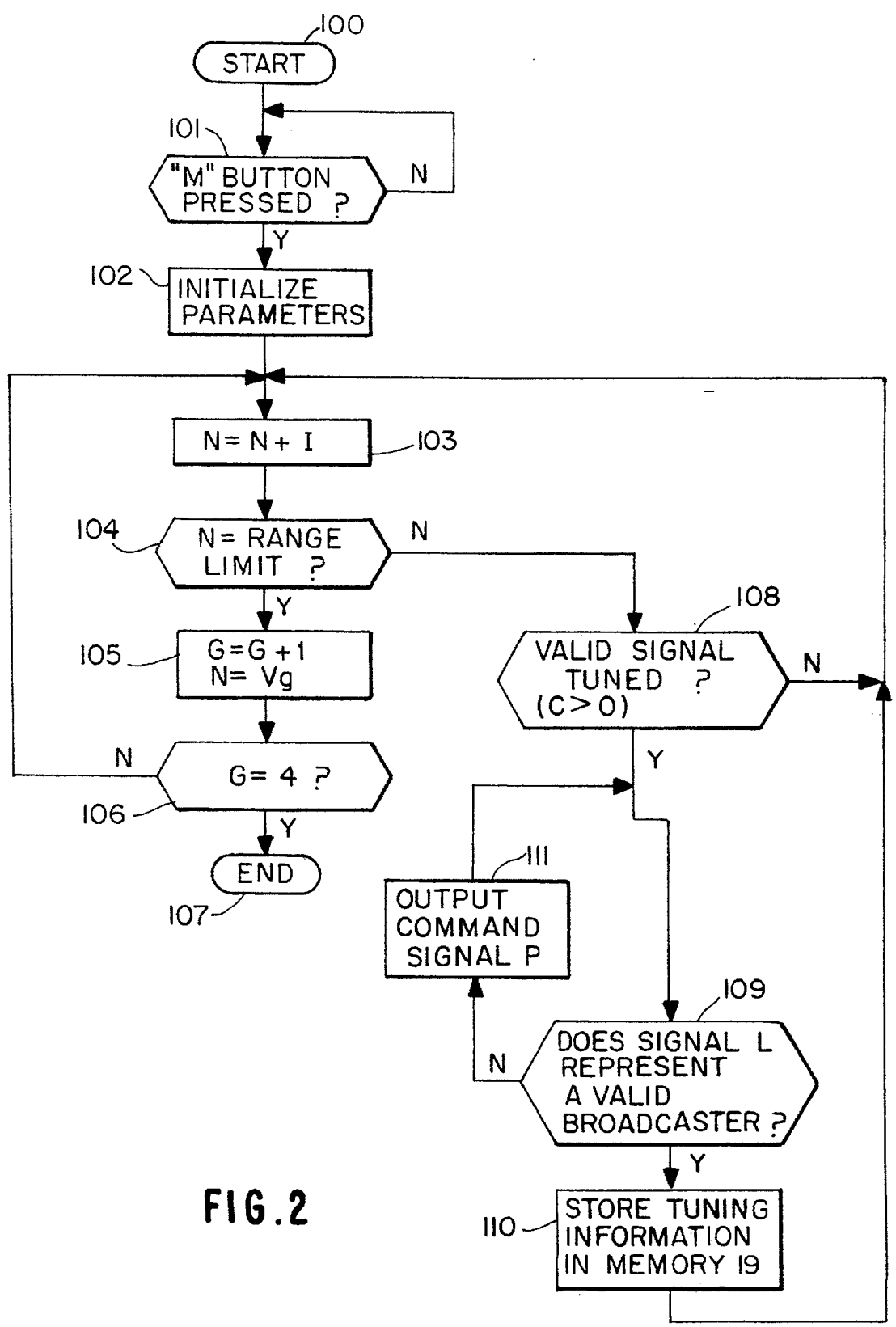
FIG. 2 is a flow chart of the functions performed by the circuit illustrated in FIG. 1.

FIG. 2 illustrates a flow chart of the logical operations of the circuit 17 shown in FIG. 1. The control circuit 17 may be implemented by various devices such as a wired logic system or a microprocessor. If the circuit 17 is implemented by a microprocessor, the programming instructions for the logical operations may be stored in the ROM R.

Step 100 represents the start of the routine for searching, identifying, and memorizing various television signals. After such routine has begun, Step 101 is executed. Step 101 designates a decision step which determines if a user has input a command for initiating the routine for searching, identifying, and memorizing by determining if the button M has been pressed on the remote control 200. If the button M has be pressed, Step 102 is executed, and if the button M has not been pressed, Step 101 is executed again. (In FIG. 2, all decision steps are represented by diamond shape boxes. Furthermore, the lower exits from the diamond shape boxes are the "YES" exits, and the lateral exits are the "NO" exits).

In Step 102, the various parameters of the routine are initialized. For instance, the parameters for searching for a broadcaster's identity are initialized, the index range G is set to 1, and the frequency division index N is set V1 (i.e. set to the initial rate of the range G). As is well known, frequency division is a fundamental part of frequency synthesis tuning systems.

After the various parameters are initialized, Step 103 is executed. During Step 103, the frequency division index N is increased to a fixed quantity (N=N+I). The amount I by which the index N is increased may be equal to 1 if it is desired to evaluate the range of television signals with small equal steps at a fine resolution. (In typical televisions, such fine resolution is equal to 50 or 62.5 KHz). On the other hand, the amount I may be equal to a higher number if it is desired to evaluate the range with larger steps at a lower resolution. Also, a fast system may evaluate the range of a channel step in accordance with an AFC system (automatic tune).

After the frequency division index N is increased, Step 104 determines whether or not the entire range of television signals have been evaluated by comparing the index N with a range limit contained in the ROM R. If the entire range has been evaluated, Step 105 is executed, otherwise Step 108 is executed.

In Step 105, the range G is increased by 1 (i.e. G=G+1), and the index N is correspondingly initialized in accordance with the range G (i.e. N=Vg). Subsequently, Step 106 determines if all of the ranges of the television signals have been evaluated (i.e. if G=4), and if so, Step 107 is executed.

On the other hand, if all of the ranges have not been evaluated, Step 103 is executed again.

Step 107 represents the end of the routine for searching, initializing, and memorizing. After the routine has ended, it may proceed to Step 100 or to another appropriate step.

Step 108 determines if a valid television signal has been tuned. Specifically, Step 108 considers a valid signal to have been tuned if the coincidence signal C output from the synchronism and coincidence circuit 16 is positive and considers an invalid signal to have been tuned if the coincidence signal C is not positive. If a valid television signal is tuned, Step 109 is executed, and if an invalid signal is tuned, Step 103 is executed again.

In Step 109, the control circuit 17 inputs the broadcaster identification signal L from the teletext decoder 16A. If the signal L corresponds to a valid broadcaster, Step 110 is executed, and if the signal L does not represent a valid broadcaster, Step 111 is executed.

In Step 110, the address in which the memory 19 is to store the tuning information corresponding to the broadcaster identification signal L is read from the ROM R. (The tuning information comprises the values of the range G and the index N plus the identification signal L). Subsequently, the tuning information is written into the read/write memory 19. In particular, the memory 19 is set in the WRITE mode, the memory address read from the ROM R is selected in the memory 19, the tuning information is stored in the memory 19 at the selected address, the address in sequentially incremented, and the memory 19 is set back into the READ mode. Subsequently, Step 103 is executed again.

In Step 111, the control circuit 17 outputs the command P to instruct the teletext decoder 16A to search for the broadcaster information in a different location within the preamplified video signal 20. After the command signal P is output, Step 109 is executed again.

In order to reduce the time for searching for the broadcasting stations, the bands may be swept and the broadcaster information may be stored in the order in which they there are detected. The list of broadcasters can be successively examined and the memorized stations which have a label identifying the broadcasters can be verified. Then, the stations for which broadcasters are identified can be placed in a desired order.

The information is stored in the memory 19 in a logical-intuitive order which assists the user. For instance, the order may be based on the buttons of the remote control (equivalent to the memory positions) by which the broadcasters are normally referenced by the user. For example, in Italy the signal RAI 1 may be memorized as program number 1, the signal RAI 2 may be memorized as program number 2, the signal RAI 3 may be memorized as program number 3, the Rete 4 signal may be memorized as program number 4, the Canale 5 signal may be memorized as program number 5, the Italia 1 signal may be memorized as program number 6, the Italia 7 signal may be memorized as program number 7, the signal of the Telemontecarlo may be memorized as program number 8, etc.

Furthermore, since the criteria used in one country may not correspond to the criteria used in another country, the ROM R may store rules or memorization criteria from a plurality of different countries, and the user may choose from among the several rules or memorization criteria stored in the ROM R. Also, as mentioned above, another way of choosing the criteria is to arrange the sequence of programs so that the sequence corresponds to the encoded programming system for video recorders which is known by the trade name "Show View".

Based on the description of the illustrative embodiments above, the advantages of the present invention are clear. In particular, the present invention is capable of automatically identifying the received television stations and memorizing such stations in a predetermined order. Furthermore, in the majority of situations in which an identification signal is inserted in the transmitted television signal, the identity of a plurality of broadcasters can be determined even if each of the broadcasters insert their identification signals in different positions of the their respective television signals. Furthermore, the present invention may be implemented in televisions, video recorders, and other types of receivers.

Also, one skilled in the art may clearly make numerous variations of the present invention without departing from the novel principles inherent within the invention. In particular, the various devices and the interrelation among such devices may be changed, and the devices may be replaced with components that perform equivalent functions.

For example, one alternative embodiment of the present invention may search for the identification signal in a third position of the received signal after unsuccessfully searching for the identification signal in a first and a second position. Moreover, the third position may be the sixteenth television line in which the identification signal is stored in accordance with the system VPS.

Another embodiment of the present invention may initially store all of television signals equipped with identification signals. Then, if any empty memory locations remain, the embodiment may store television signals which do not contain identification signals in the empty memory locations in an order which corresponds to the frequency of the television signals. Also, the embodiment may store television signals containing teletext signals before storing television signals without teletext signals. In a third embodiment, the present invention may utilize the stored broadcasters information to create a memory map which can be displayed on the screen upon being requested by the user.

What is claimed is:

1. A device for identifying and memorizing television stations which respectively transmit television signals, wherein said device comprises:

a receiver for selectively receiving said television signals;

control means for evaluating said television signals to automatically identify said television stations which transmit said television signals and for memorizing said television stations in an established order which is independent from a transmission frequency of said television stations; and a memory, wherein a plurality of different rules for identifying said television stations are stored in said memory, wherein said control means executes a first identification attempt to identify one of said television stations based on one of the received television signals, wherein said first identification attempt is executed according to a first rule of said plurality of different rules, wherein said control means executes a second identification attempt to identify said one of said television stations based on the same television signal which provided the basis for said first attempt when said first identification attempt is unsuccessful, and wherein said second identification attempt is executed according to a second rule of said plurality of different rules.

2. The device according to claim 1, wherein said control means inputs a specific command and, in response to said specific command, proceeds to:
   a) tune a selected television signal transmitted from a particular one of said television stations;
   b) execute said first identification attempt,
      wherein said first identification attempt attempts to locate and decode a broadcaster identification signal inserted in said selected television signal by examining a first predetermined position of said selected television signal, and
      wherein said first predetermined position corresponds to a position defined by said first rule;
   c) determine if said broadcaster identification signal is located in said first predetermined position;
   d) memorize said tuning information of said selected television station in a predetermined address of a read/write memory when said broadcaster identification signal is located in said first predetermined position;
   e) execute said second identification attempt when said broadcaster identification signal is not located in said first predetermined position,
      wherein said second identification attempt attempts to locate and decode said broadcaster identification signal by examining a second predetermined position of said selected television signal, and
      wherein said second predetermined position corresponds to a position defined by said second rule.

3. The device according to claim 1, wherein said control means inputs a specific command and, in response to said specific command, proceeds to:
   a) tune a selected television signal transmitted from a particular one of said television stations;
   b) execute said first identification attempt, wherein said first identification attempt attempts to locate and decode a broadcaster identification signal inserted in selected television signal by examining a first predetermined position of said selected television signal,
      wherein said first predetermined position corresponds to a position defined by said first rule;
   c) determine if said broadcaster identification signal is located in said first predetermined position;
   d) memorize said tuning information of said selected television station in a predetermined address of a read/write memory when said broadcaster identification signal is located in said first predetermined position;
   e) execute said second identification attempt when said broadcaster identification signal is not located in said first predetermined position,
      wherein said second identification attempt attempts to locate and decode said broadcaster identification signal by examining a second predetermined position of said selected television signal,
      wherein said second predetermined position corresponds to a position defined by said second rule;
   f) determine if said broadcaster identification signal is located in said second predetermined position when said second identification attempt is executed;
   g) designate another of said television signals from another of said television stations as said selected television signal;
   h) repeat said steps a) through g) until said control means has designated all of said television signals as said selected television signal; and
   i) place said television stations that have been memorized in said read/write memory in a predetermined order.

4. The device according to claim 2, wherein said first and second identification attempts attempt to locate said broadcaster identification signal in a teletext signal contained in said selected television signal.

5. The device according to claim 4, wherein one of said first and second identification attempts attempts to locate said broadcaster identification signal in line 30 of said teletext signal.

6. The device according to claim 5, wherein another of said first and second identification attempts attempts to locate said broadcaster identification signal in line 0 of said teletext signal.

7. The device according to claim 2, wherein one of said first and second attempts attempts to locate said broadcaster identification signal in said selected television signal, according to the document of the E.B.U. SPB 459.

8. The device according to claim 7, wherein said one of said first and second identification attempts attempts to locate said broadcaster identification signal in said selected television signal by making use of an 8/30 packet.

9. The device according to claim 8, wherein said one of said first and second identification attempts attempt to locate said broadcaster identification signal in said selected television signal by making use of an 8/30 packet format 1.

10. The device according to claim 6, wherein said control means attempts to locate said broadcaster identification signal in one of line 16 of said selected television signal and a position corresponding to a norm EBU packet 8/30 format 2.

11. The device according to claim 1, wherein said established order for memorizing said television stations is stored in said memory.

12. The device according to claim 11, wherein said established order is one of a plurality of different orders of memorization stored in said memory.

13. The device according to claim 12, wherein said device further comprises:
   selecting means for selecting said established order from among said plurality of different orders of memorization.

14. The device according to claim 12, wherein said established order corresponds to an order which is defined by a coded programming system for video recorders that are used in a zone in which said device is used.

15. The device according to claim 2, wherein, after said control means has memorized all of said television stations which transmit said television signals containing broadcaster identification signals which were located by said first and second identification attempts, said control means memorizes remaining television stations of said television stations,
   wherein said remaining television stations transmit television signals which do not contain broadcaster identification signals that are located by said first and second identification attempts, and
   wherein said remaining television stations are memorized in an order which corresponds to frequencies at which said remaining television stations respectively transmit said television signals.

16. The device according to claim 2, wherein, after said control means memorizes all of said television stations, said control means creates a memory map and wherein said control means displays said memory map on a display screen upon receiving a display command.

17. The device according to claim 1, wherein said device is incorporated in a television receiver.

18. The device according to claim 1, wherein said device is incorporated in a video recorder.

19. The device according to claim 2, wherein said first predetermined position is defined by a first predetermined norm SPB 459.

20. The device according to claim 2, wherein said first predetermined position is defined by a first predetermined norm SPB 492.

21. The device according to claim 2, wherein said second predetermined position is defined by a second predetermined norm.

22. The device according to claim 2, wherein said control means further proceeds to:
f) designate another of said television signals transmitted from another of said television stations as said selected television signal; and
g) repeat said steps a) through f) until said control means has designated all of said television signals as said selected television signal.

23. The device according to claim 3, wherein said first predetermined position is defined by a first predetermined norm SPB 459.

24. The device according to claim 3, wherein said first predetermined position is defined by a first predetermined norm SPB 492.

25. The device according to claim 3, wherein said second predetermined position is defined by a second predetermined norm.

26. The device according to claim 3, wherein said step i) further comprises the steps of:
i1) examine said television stations that have been memorized in said read/write memory;
i2) determine which of said television stations that have been memorized in said read/write memory have a tag; and
i3) place said television stations that have been memorized in said read/write memory in said predetermined order.

27. The device according to claim 3, wherein said first and second identification attempts attempt to locate said broadcaster identification signal in a teletext signal contained in said selected television signal.

28. The device according to claim 27, wherein one of said first and second identification attempts attempts to locate said broadcaster identification signal in line 30 of said teletext signal.

29. The device according to claim 28, wherein another of said first and second identification attempt attempts to locate said broadcaster identification signal in line 0 of said teletext signal.

30. The device according to claim 3, wherein one of said first and second attempts attempts to locate said broadcaster identification signal in said selected television signal, according to the document of the E.B.U. SPB 459.

31. The device according to claim 30, wherein said one of said first and second identification attempts attempts to locate said broadcaster identification signal in said selected television signal by making use of an 8/30 packet.

32. The device according to claim 31, wherein said one of said first and second identification attempts attempt to locate broadcaster identification signal in said selected television signal by making use of an 8/30 packet format 1.

33. The device according to claim 29, wherein said control means attempts to locate said broadcaster identification signal in one of line 16 of said selected television signal and a position corresponding to a norm EBU packet 8/30 format 2.

34. The device according to claim 3, wherein, after said control means has memorized all of said television stations which transmit said television signals containing broadcaster identification signals which were located by said first and second identification attempts, said control means memorizes remaining television stations of said television stations,
wherein said remaining television stations transmit television signals which do not contain broadcaster identification signals that are located by said first and second identification attempts, and
wherein said remaining television stations are memorized in an order which corresponds to frequencies at which said remaining television stations respectively transmit said television signals.

35. The device according to claim 15, wherein said control means memorizes said remaining television stations which transmit television signals that contain teletext signals before said control means memorizes said remaining television stations which transmit television signals that do not contain teletext signals.

36. The device according to claim 34, wherein said control means memorizes said remaining television stations which transmit television signals that contain teletext signals before said control means memorizes said remaining television stations which transmit television signals that do not contain teletext signals.

* * * * *